US007476269B2

(12) United States Patent
Begley et al.

(10) Patent No.: US 7,476,269 B2
(45) Date of Patent: Jan. 13, 2009

(54) EVAPORATIVE EMISSIONS CANISTER SUITABLE FOR MARINE USE

(75) Inventors: Chris C. Begley, Ortonville, MI (US); Charles H. Covert, Manchester, NY (US)

(73) Assignee: Delphi Technologies, Inc., Troy, MI (US)

( * ) Notice: Subject to any disclaimer, the term of this patent is extended or adjusted under 35 U.S.C. 154(b) by 416 days.

(21) Appl. No.: 11/292,962

(22) Filed: Dec. 2, 2005

(65) Prior Publication Data

US 2007/0125235 A1 Jun. 7, 2007

(51) Int. Cl.
*F02M 33/02* (2006.01)
*B01D 53/04* (2006.01)

(52) U.S. Cl. .......................... 96/147; 96/149; 123/519; 440/88 F; 114/382

(58) Field of Classification Search .................. 95/146; 96/137, 147, 149; 123/518, 519; 440/88 F; 114/382
See application file for complete search history.

(56) References Cited

U.S. PATENT DOCUMENTS 4,717,401 A * 1/1988 Lupoli et al. .................. 96/141
4,829,968 A * 5/1989 Onufer ....................... 123/518
5,259,412 A * 11/1993 Scott et al. .................. 137/588
5,327,873 A * 7/1994 Ohuchi et al. ............... 123/520
5,901,689 A * 5/1999 Kimura et al. .............. 123/518
6,537,355 B2 3/2003 Scardino et al.
2002/0148354 A1* 10/2002 Amano et al. ................. 96/112
2003/0005912 A1* 1/2003 Koyama et al. ............. 123/520
2003/0082382 A1* 5/2003 Hiltzik et al. ............... 428/403
2006/0207576 A1* 9/2006 Mills et al. .................. 123/519
2007/0034193 A1* 2/2007 King .......................... 123/519

* cited by examiner

*Primary Examiner*—Frank M Lawrence
(74) *Attorney, Agent, or Firm*—Paul L. Marshall

(57) ABSTRACT

An evaporative emissions control canister for adsorbing fuel vapors from a fuel tank on a marine vessel. The canister comprises a polymeric extruded housing that may be formed to any desired length or cut from extruded stock. Identical end caps having tubing connectors are bonded to opposite ends of the housing, defining an inlet and an outlet. Marine-grade pelletized activated carbon is disposed within the housing between porous slidable plates that are spring loaded against the end caps to pack the carbon tightly against the housing walls. Mounting brackets at each end are rotatably attached to the end caps so that opposite ends of the assembly may be attached to different surfaces of the vessel's hull, thus relieving stress which might be introduced into the assembly. Preferably, the assembly is wrapped in a fire retardant material.

14 Claims, 2 Drawing Sheets

EVAPORATIVE EMISSIONS CANISTER SUITABLE FOR MARINE USE

TECHNICAL FIELD

The present invention relates to adsorption of hydrocarbon vapors; more particularly, to carbon-containing canisters for adsorbing fuel vapors displaced from fuel tanks during diurnal temperature changes; and most particularly, to an improved evaporative emissions canister suitable for use in boats having fixed onboard fuel tanks.

BACKGROUND OF THE INVENTION

Canisters for adsorptive control of fuel vapors are well known in the automotive arts. A typical automotive emissions control canister comprises a housing having an inlet and outlet and a chamber for holding a charge of activated carbon. The inlet is connected to the headspace in the vehicle's fuel tank and the outlet is vented to atmosphere. In addition, the canister has a purge tube located on the inlet end of the canister which is connected to a vacuum source on the engine. When the fuel vapor volume expands thermally in the tank, the displaced fuel vapors are adsorbed by the activated carbon bed. When the engine is operated, the engine vacuum is applied to the purge tube and air is drawn through the carbon bed, desorbing the adsorbed vapors and carrying the vapors into the engine's intake manifold.

At the present time, emissions control canisters are not used with inboard marine applications. When boats having fixed fuel tanks are subjected to diurnal temperature changes, the displaced vapors are passed undesirably into the atmosphere. It is believed that US Federal law will require for model year 2011 that vessels having fixed on-board fuel tanks have evaporative emission control.

Prior art automotive-type canisters are not readily adaptable to use in boats. Such canisters are bulky and typically have a U-shaped vapor path with inlets and outlets formed at the top. On a marine vessel, the tank vent outlet typically is located high on the vessel topsides just below the rail, to avoid taking in water during vessel use. Thus, a suitable marine-use canister would have a vapor inlet at the bottom, for direct vapor flow from the fuel tank, and an outlet at the top, for connection to the vapor through-hull fitting. Of course, canisters may be mounted horizontal as well.

Further, most small pleasure boats having onboard fuel tanks are formed by assembling a molded inner hull, containing the decking and vessel superstructure, to a molded outer hull containing the engine mounts and through-hulls. Typically, a dead space is formed between the inner hull and outer hull above the waterline. Such space is available and strategically ideal for mounting a marine emissions adsorption canister; in fact, prior art vent lines typically pass through this space. However, such a canister must have a relatively small diameter, preferably less than about 4 inches, to fit easily into this space.

Another disadvantage of trying to adapt an automotive canister to marine use is that such canisters are manufactured in expensive, complicated molds which are justified only because many identical canisters are required for an entire line of automobiles, whereas the total annual volume of boats is only about 550,000 manufactured by over 1200 boat builders producing many thousands of lines of boats, each of which has different dimensions for the between-hull space. Thus, prior art automotive canisters, which may number in design no more than a few dozen or so in any model year, are not readily adaptable to fit into the huge number of different spaces presented by the boat industry.

An additional disadvantage is that the carbon beds in prior art automotive canisters are vulnerable to contamination by water in a marine environment, reducing the effectiveness of adsorption.

A still further disadvantage is that prior art automotive canisters are significantly more complicated than will be required, at least initially, for marine fuel tanks. A marine emissions canister may be inserted into the prior art vapor exhaust flow path, and is regenerated passively by the inhalation of air into the fuel tank as the fuel tank cools down during the diurnal. Thus, a marine canister can be significantly simpler and less expensive than an automotive canister.

A prior art linear canister having an inlet at one end and an outlet at the other is disclosed in U.S. Pat. No. 6,537,355, the relevant disclosure of which is incorporated by reference herein. A carbon monolith is disposed within a two-part cylindrical shell and is insulated and suspended therein by resilient annular spacers which also prevent bypassing of fuel vapors.

The disclosed canister is intended for automotive uses and therefore suffers from most of the above-recited shortcomings although it is linear and relatively slim. However, the housing is formed by injection molding in expensive molds to provide integral features for joining the shell halves together. Thus, the overall length and capacity of the canister is not easily or economically changed to accommodate different between-hull spaces. Further, the carbon monolith, although extremely efficient in scavenging fuel vapors, is both expensive and delicate; hence the need for resilient, insulative spacers. Initial marine requirements can be met by significantly simpler, less expensive forms of activated carbon.

It is a principal object of the present invention to provide a simple emissions control canister meeting anticipated marine requirements.

It is a further object of the invention to simply, reliably, and inexpensively adsorb fuel vapor emissions from a fixed fuel tank on a marine vessel.

SUMMARY OF THE INVENTION

Briefly described, a canister assembly in accordance with the invention comprises a longitudinal housing, preferably cylindrical and preferably formed by extrusion of a polymer such as polypropylene, or nylon. Thus, there are no molding costs, fixed and variable, for the housing as in prior art injection molded automotive canisters. The housing may be extruded to any desired length or may be cut from generic extruded stock of indeterminate length. First and second end caps, which preferably are identical and have tubing connectors extending therefrom, are bonded to opposite ends of the housing, defining respectively inlet and outlet means. Preferably, the ends are identical and either end may be used as either the inlet or the outlet. Adsorptive material, preferably marine-grade, pelletized, activated carbon, is disposed loosely within the housing between first and second porous transverse slidable plates that are spring loaded axially against the interiors of the end caps to maintain the carbon pack tightly against the walls of the housing. Preferably, a mounting bracket is rotatably attached to each of the end caps such that opposite ends of the assembly may be attached to different surfaces of a vessel hull which may undergo relative movement, thus relieving stress which would otherwise be introduced into the assembly. Preferably, the assembly is wrapped in a fire retardant material.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
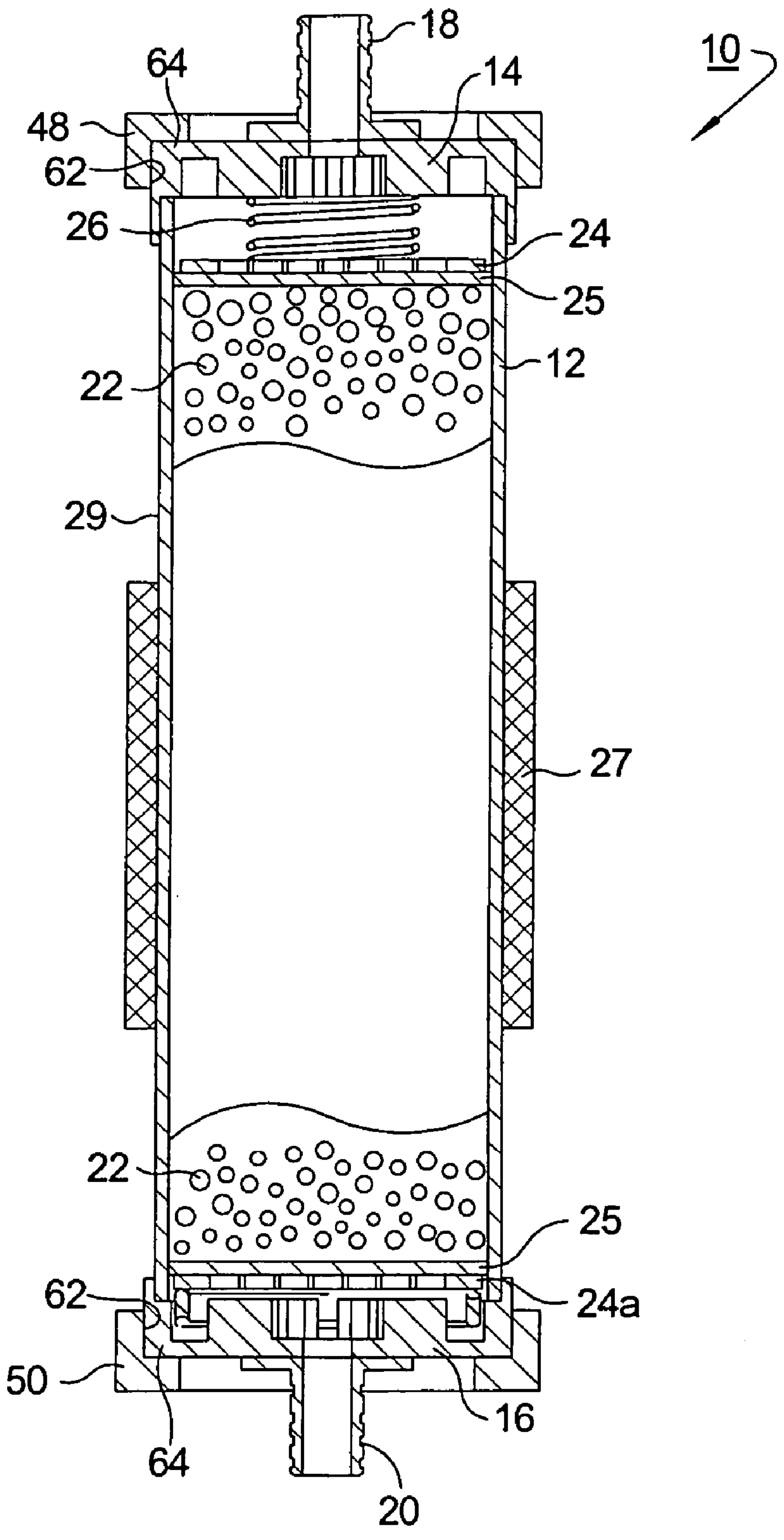
FIG. 1 is a cross-sectional view of a marine canister in accordance with the invention.

Referring to FIG. 1, an improved canister assembly 10 for adsorption of fuel vapors in accordance with the invention comprises an elongate housing 12 having first and second end caps 14,16, each end cap including a tubular connector 18,20 for connection of assembly 10 to hose or pipe as described below. Preferably, housing 12 is formed by linear extrusion in known fashion of a thermoplastic polymer, for example, a polyolefin such as polypropylene, or a polyamide such as nylon. Preferably, end caps 14,16 are formed by injection molding of similar polymeric materials such that the end caps may be sealingly joined to the housing in known fashion as by adhesives, laser welding, spin welding, or the like. Alternatively, housing 12 and/or end caps 14,16 may be formed of a corrosion-resistant metal such as a stainless steel and may be welded together in known fashion to form assembly 10.

An amount of a vapor-adsorbent material 22 is disposed within housing 12 such that vapors entering housing 12 through one of tubing connectors 18,20 must pass through material 22 before reaching the other connector. Preferably, material 22 contains activated carbon, and most preferably, material 22 is in the form of marine grade carbon pellets which are readily handled with minimal carbon dust and which are treated to sustain lower moisture adsorption than other carbon grades commonly used for prior art automotive canisters.

An amount of carbon pellets may be loaded into the housing sufficient to fully fill the internal chamber; however, because shifting and settling are known to occur in pelletized materials, it is preferable to provide means for actively maintaining the carbon pellets in a compact bed with full contact against the inner walls of the housing. In a presently preferred embodiment, assembly 10 includes at least one porous plate 24 slidably disposed within housing 12 and substantially full-fitting therewithin against the walls of housing 12 between adsorbent 22 and one of end caps 14,16. A compression spring 26 is disposed between plate 24 and the adjacent end cap 14,16 to urge adsorbent material 22 into compression. Preferably a second plate **24*a* is similarly disposed adjacent the other end cap. Each of plates 24,24*a* may include a foam screen 25 adjacent adsorbent material 22**.

Preferably, the outer surface 29 of assembly 10 is wrapped, at least in part, in a fire-resistant material 27, e.g., fiberglass cloth.

Figure 2:
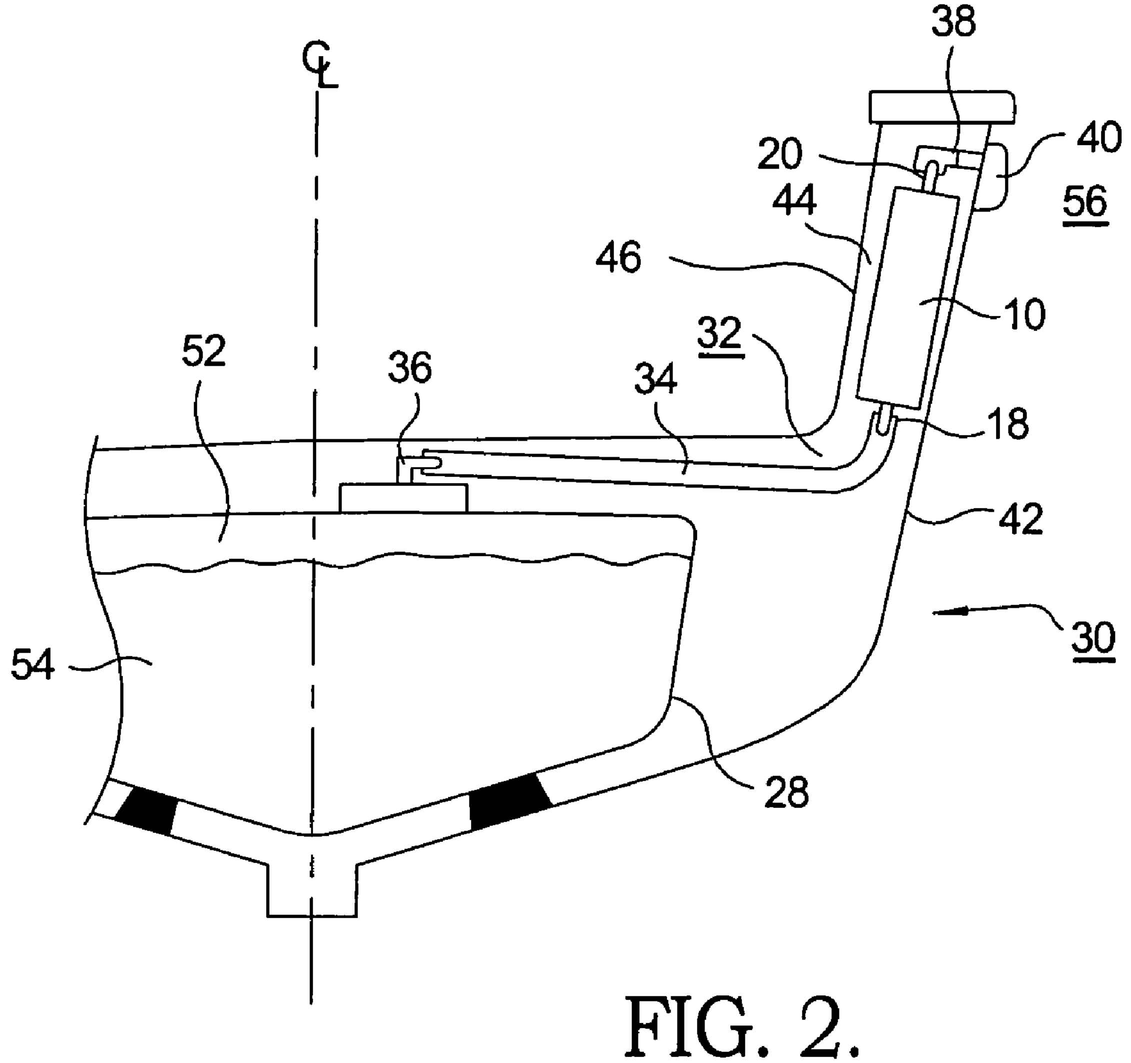
FIG. 2 is a schematic cross-sectional view of a boat showing a currently preferred mounting of a canister in accordance with the invention between the inner and outer hulls thereof.

Referring now to FIGS. 1 and 2, in a preferred use in conjunction with a fixed onboard fuel tank 28 on a marine vessel 30, canister assembly 10 is connected into a vent line 32 comprising a first conduit 34, extending from a tank headspace fitting 36 to first tubular connector 18, and a second conduit 38, extending from second tubular connector 20 to a water-deflecting through-hull fitting 40 mounted in outer vessel hull 42. In a presently preferred installation, assembly 10 is disposed in a space 44 between outer hull 42 and an inner hull 46, which construction of hulls and space is well known in the boat manufacturing arts. Preferably, assembly 10 includes first and second mounting brackets 48,50, each of which is preferably rotatably attached to one of end caps 14,16, as shown in FIG. 1, thus allowing for relative rotational motion between the brackets and end caps and permitting great adaptability in choice of attachment surfaces and orientations for the assembly.

Brackets 48,50 include for suitably attaching the assembly to the hull of the vessel as readily known in the art. Brackets 48,50 each further include circular recess 62 for rotatably receiving circular ends 64 of end caps 14,16 such that, once brackets 48,50 are secured to the vessel hull, elongate housing 12 is trapped axially between the brackets but is permitted to rotate within the recesses. An important advantage of canister assembly 10 over the prior art is that it is relatively long and slim, making it readily adaptable to use in a wide range of boats having spaces 44 of varying dimensions. Preferably, the overall length of assembly 10 is at least three times the diameter of housing 12.

In use, vent line 32 defines a breather pipe for fuel tank 28 to accommodate volumetric changes in tank headspace 52. For example, when fuel 54 and headspace 52 are thermally heated, the vapor pressure of the fuel increases forcing vapor from the headspace 52 through vent line 32 where it is adsorbed in canister assembly 10 and prevented from reaching atmosphere 56. Conversely, as the fuel 54 and headspace 52 are thermally cooled, the vapor pressure decreases and air is drawn in through fitting 40 and sweeps adsorbed vapors from canister assembly 10 into fuel tank 28.

Another important advantage of assembly 10, not possessed by prior art injection molded canister assemblies, is that the length of housing and volume of adsorbent may be varied at will without requiring any tooling changes in manufacture. Because the housing is formed by continuous extrusion, preferably as a cylindrical pipe, the housing may be formed to any desired length. Indeed, the housing may be cut, the canister filled with carbon pellets, and the end caps bonded to the housing at the point of assembly into a vessel if so desired.

Another important advantage of a canister in accordance with the invention is that it may be used not only for marine purposes but also in various land-based applications, for example some automotive applications requiring only a simpler emissions control device wherein an inexpensive canister having an extruded plastic housing can suffice.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A canister assembly for adsorbing fuel vapors from a fuel tank headspace, comprising:

a) an elongate tubular housing having first and second ends;

b) an amount of fuel-adsorbent material disposed within said housing;

wherein said first end of said housing includes a first connector extending therefrom and said second end of said housing includes a second connector extending therefrom; and c) at least one mounting bracket rotatably disposed on one of said ends.

2. A canister assembly in accordance with claim 1 further comprising a first end cap attached to said first end and a second end cap attached to said second end.

3. A canister assembly in accordance with claim 2 further comprising:

a) at least one porous plate slidably disposed within said housing between said fuel-adsorbent material and one of said first and second end caps; and b) a biasing element for urging said porous plate in an axial direction away from said one of said first and second end caps to compress said fuel-adsorbent material.

4. A canister assembly in accordance with claim 1 wherein said housing is formed of a polymer or a metal.

5. A canister assembly in accordance with claim 4 wherein said polymer is selected from the group consisting of polyolefin and polyamide.

6. A canister assembly in accordance with claim 4 wherein said housing formed of a polymer is formed by extrusion.

7. A canister assembly in accordance with claim 1 wherein said housing has a constant cross-sectional shape and area over the length thereof.

8. A canister assembly in accordance with claim 3 further comprising a second porous plate slidably disposed within said housing between said fuel-adsorbent material and the other of said first and second end caps.

9. A canister assembly in accordance with claim 1 wherein said first and second connectors define an assembly inlet and an assembly outlet, respectively.

10. A canister assembly in accordance with claim 2 wherein said first and second end caps are identical.

11. A canister assembly in accordance with claim 1 wherein said housing has a diameter and wherein said assembly has an overall length and wherein the ratio of said overall length to said diameter is greater than about 3.

12. A canister assembly in accordance with claim 1 further comprising at least one mounting brackets rotatably disposed on the other of said ends.

13. A canister assembly in accordance with claim 1 wherein said fuel-adsorbent material includes elemental carbon.

14. A canister assembly in accordance with claim 13 wherein said elemental carbon is in the form of marine-grade carbon pellets.

* * * * *